(12) United States Patent
Huang et al.

(10) Patent No.: US 8,385,003 B1
(45) Date of Patent: Feb. 26, 2013

(54) ZOOM LENS

(75) Inventors: Hai-Jo Huang, New Taipei (TW); Sheng-An Wang, New Taipei (TW); Fang-Ying Peng, New Taipei (TW); An-Tze Lee, New Taipei (TW); Xiao-Na Liu, Guangdong (CN)

(73) Assignees: Hong Fu Jin Precision Industry (Shenzhen) Co. Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/281,420

(22) Filed: Oct. 25, 2011

(30) Foreign Application Priority Data

Sep. 23, 2011 (CN) .............................. 201110285849

(51) Int. Cl.
*G02B 15/14* (2006.01)

(52) U.S. Cl. ........ 359/689; 359/680; 359/682; 359/683; 359/684; 359/685; 359/716; 359/740

(58) Field of Classification Search .................. 359/676, 359/680, 682–685, 689, 716, 740
See application file for complete search history.

(56) References Cited

U.S. PATENT DOCUMENTS

| 8,000,023 B2 | 8/2011 | Chou et al. | |
|---|---|---|---|
| 2012/0050884 A1* | 3/2012 | Kurashige et al. | ............ 359/684 |

* cited by examiner

*Primary Examiner* — Evelyn A. Lester
(74) *Attorney, Agent, or Firm* — Altis Law Group, Inc.

(57) ABSTRACT

A zoom lens includes a first lens group of negative refractive power, a second lens group of positive refractive power and a third lens group of positive refractive power. The zoom lens satisfies the following condition formulas: $0.68<|f2/f1|<0.85$, and $0.65<L2/fT<0.86$, where f1 represents an effective focal length of the first lens group, f2 represents an effective focal length of the second lens group, L2 is a displacement of the second lens group when the zoom lens varies from a wide-angle state to a telephoto state, and fT represents an effective focal length of the zoom lens which is in the telephoto state.

12 Claims, 14 Drawing Sheets

ZOOM LENS

BACKGROUND

1. Technical Field

The present disclosure relates to lenses and, particularly, to a zoom lens which has a high zoom ratio, a reduced total overall length, and a high resolution.

2. Description of Related Art

To obtain small camera modules which provide a high quality image over a large object distance range, a zoom lens having a high zoom ratio, a short total overall length, and a high resolution is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described in detail with reference to the drawings.

Figure 1:
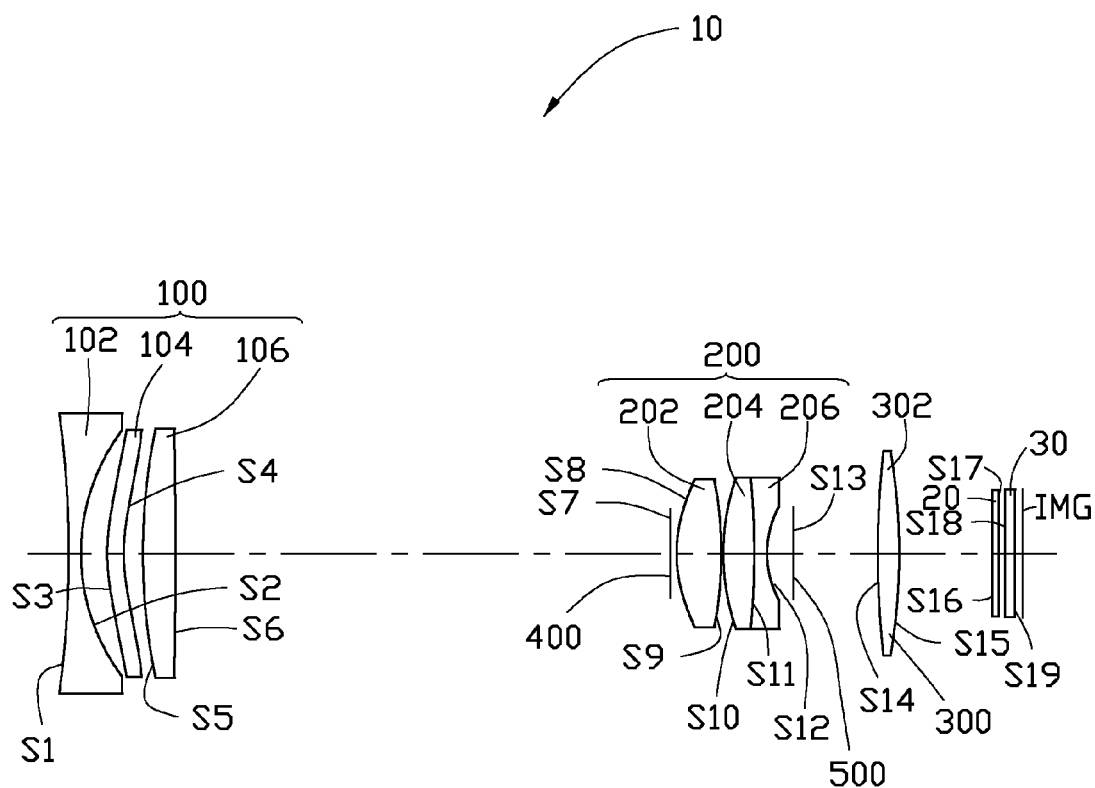
FIG. 1 is a schematic view of a zoom lens, according to an embodiment.

Referring to FIG. 1, a zoom lens 10, according to an embodiment, includes, in this order from the object-side to the image-side thereof, a first lens group 100 of negative refractive power, a second lens group 200 of positive refractive power, and a third lens group 300 of positive refractive power. The zoom lens 10 satisfies the following condition formulas: $0.68<|f2/f1|<0.85$ and $0.65<L2/fT<0.86$, where f1 represents the effective focal length of the first lens group 100, f2 represents the effective focal length of the second lens group 200, L2 is the displacement of the second lens group 200 when the zoom lens 10 is changed from a wide-angle state to a telephoto state, and fT represents the effective focal length of the zoom lens 10 which is in a telephoto state.

By satisfying the above-listed condition formulas, the effective focal length of the zoom lens 10 can be varied over a large range by changing a distance between the first lens group 100 and the second lens group 200, so obtaining a relatively high zoom ratio. In contrast, if the above-listed condition formulas are not satisfied, the advantages of a high zoom ratio, a short total overall length, or/and the high resolution of the zoom lens 10 can not be achieved.

For example, if the condition formula: $0.68<|f2/f1|<0.85$ is not satisfied, then (1) the spherical aberration and color aberration occurring in the zoom lens 10 in both the wide-angle and telephoto states can not be effectively controlled if the effective focal length of the second lens group 200 is too short, thus degrading the resolution of the zoom lens 10; and (2) the distortion occurring in the zoom lens 10 in the wide-angle state can not be effectively controlled if the effective focal length of the first lens group 100 is too short, thus again degrading the resolution of the zoom lens 10, and (3) the total length of the zoom lens 10 in the wide-angle state can not be effectively controlled if the effective focal length of the first lens group 100 is too long, thus increasing the total overall length of the zoom lens 10.

If the condition formula: $0.65<L2/fT<0.86$ is not satisfied, then the total overall length of the zoom lens 10 can not be controlled if the displacement is too large, or the spherical aberration and color aberration occurring in the zoom lens 10 in the wide-angle state can not be controlled if the displacement is too small.

When capturing images, light rays enter the zoom lens 10, passing through the first lens group 100, the second lens group 200, and the third lens group 300 in sequence, and then pass through a filter 20 and a cover glass 30, and finally form images on an image plane IMG. During the capture, the distance between the first lens group 100 and the second lens group 200 can be adjusted to obtain a suitable effective focal length of the zoom lens 10. After the effective focal length of the zoom lens 10 has been fixed, the third lens group 300 can be moved along the optical axis of the zoom lens 10 to focus the zoom lens 10.

The first lens group 100 includes, in this order from the object-side to the image-side of the zoom lens 10, a first lens 102 of negative refractive power, a second lens 104, and a third lens 106 of positive refractive power. The second lens group 200 includes, in this order from the object-side to the image-side of the zoom lens 10, a fourth lens 202 of positive refractive power, a fifth lens 204 of positive refractive power, and a sixth lens 206 of negative refractive power. The fifth lens 204 and the sixth lens 206 are combined. The third lens group 300 includes a seventh lens 302 of positive refractive power.

The zoom lens 10 further satisfies the following condition formula: $1.05<V5/V6<1.9$, where V5 and V6 are the Abbe numbers of light at the wavelength of 587.6 nm (d light) in the fifth and sixth lenses 204 and 206, respectively. In this way, any color aberration occurring in the zoom lens 10 can be further restricted.

The zoom lens 10 also satisfies the condition formula: $1.0<V4/V5<2.0$, where V4 represents the Abbe number of d light in the fourth lens 202. In this way, any color aberration of the zoom lens 10 can be still further restricted.

The second lens 104 includes at least one aspheric surface. As such, any field curvature and astigmatism occurring in the zoom lens 10 when the zoom lens 10 is in the wide-angle state can be effectively controlled. The fourth lens 202 includes at least one aspheric surface. As such, any spherical aberration and color aberration occurring in the zoom lens 10 in both the wide-angle and telephoto states can be restricted. The second lens 104 employs a plastic lens to reduce the costs of the zoom lens 10.

The zoom lens 10 includes a first aperture stop 400 interposed between the first lens group 100 and the second lens group 200, and a second aperture stop 500 interposed between the second lens group 200 and the third lens group 300. The zoom lens 10 includes, in this order from the object-side to the image-side thereof, surfaces S1-S19.

The zoom lens 10 satisfies Table 1, where the following symbols are used:

F: the effective focal length of the zoom lens;
FNo: the focal ratio (F number);
2ω: the field angle;
R: the curvature radius of each surface;
D: the distance between each two adjacent surfaces along the optical axis of the zoom lens 10;
Nd: the refractive index of d light in each lens or the cover glass 20; and
Vd: the Abbe number of d light in each lens or the cover glass 20

TABLE 1

| Surface | R(mm) | D(mm) | ND | VD |
|---|---|---|---|---|
| S1 | −50.423 | 0.6 | 1.835 | 42.72 |
| S2 | 10.012 | 1.29 | — | — |
| S3 | 9.787356 | 0.81 | 1.535 | 55.99 |
| S4 | 9.191582 | 0.939 | — | — |
| S5 | 30.479 | 1.6 | 1.946 | 17.98 |
| S6 | −317.494 | D6(see Table 3) | — | — |
| S7 | Infinity | 0.3 | — | — |
| S8 | 6.935714 | 2.197 | 1.623 | 58.16 |
| S9 | −19.83019 | 0.1 | — | — |
| S10 | 11.329 | 1.515 | 1.755 | 52.32 |
| S11 | −40.324 | 0.631 | 1.717 | 29.5 |
| S12 | 4.78 | 1.3 | — | — |
| S13 | Infinity | D13(see Table 3) | — | — |
| S14 | 45.108 | 1.05 | 1.729 | 54.68 |
| S15 | −29.755 | D15(see Table 3) | — | — |
| S16 | Infinity | 0.3 | 1.52 | 64.2 |
| S17 | Infinity | 0.3 | — | — |
| S18 | Infinity | 0.5 | 1.52 | 64.2 |
| S19 | Infinity | 0.4 | — | — |
| IMG | Infinity | — | — | — |

The aspherical surface is shaped according to the formula:

$$x = \frac{ch^2}{1 + \sqrt{1 - (k+1)c^2 h^2}} + \sum A_i h^i,$$

where h is the height from the optical axis of the zoom lens 10 to the aspherical surface, c is the vertex curvature, k is a conic constant, and $A_i$ is the i-th order correction coefficient of the aspherical surface.

The zoom lens 10 also satisfies Tables 2-3:

TABLE 2

|  | S3 | S4 | S8 | S9 |
|---|---|---|---|---|
| k | −5.510856 | 0.8865993 | −0.3918423 | 2.78023 |
| A4 | −0.00048842434 | −0.0016357736 | −0.00044334734 | 3.0390067e−005 |
| A6 | −4.7214722e−005 | −3.2525921e−005 | 2.7626319e−005 | 3.482905e−005 |
| A8 | 3.6857295e−006 | 3.8030952e−006 | −5.9218642e−006 | −1.2655887e−005 |
| A10 | −6.5088414e−008 | −9.1511012e−008 | −3.1699994e−007 | 1.2722942e−006 |
| A12 | −7.7884232e−010 | −6.496452e−010 | 1.602165e−007 | −5.4919471e−009 |
| A14 | 2.717763e−011 | 4.5185624e−011 | −1.4419397e−008 | −6.630245e−009 |
| A16 | −1.0836931e−013 | −4.2218162e−013 | 4.1297931e−010 | 2.8530968e−010 |

TABLE 3

| F | FNo | 2ω | D6(mm) | D13(mm) | D15(mm) |
|---|---|---|---|---|---|
| 5.192 | 3.38 | 74 | 24.295 | 4.136 | 4.582 |
| 19.836 | 5.26 | 22.4 | 2.645 | 20.077 | 4.109 |
| 29.809 | 6.15 | 15 | 0.441 | 30.482 | 2.435 |

The values of relevant parameters and the condition formulas are listed in Table 4:

TABLE 4

| parameter/condition formula | value |
|---|---|
| f1 | −16.517 |
| f2 | 11.934 |
| fT | 29.809 |
| L2 | 20.542 |
| V4 | 58.16 |
| V5 | 52.32 |
| V6 | 29.5 |
| |f2/f1| | 0.722 |
| L2/fT | 0.689 |
| V5/V6 | 1.774 |
| V4/V5 | 1.112 |

Figure 2:
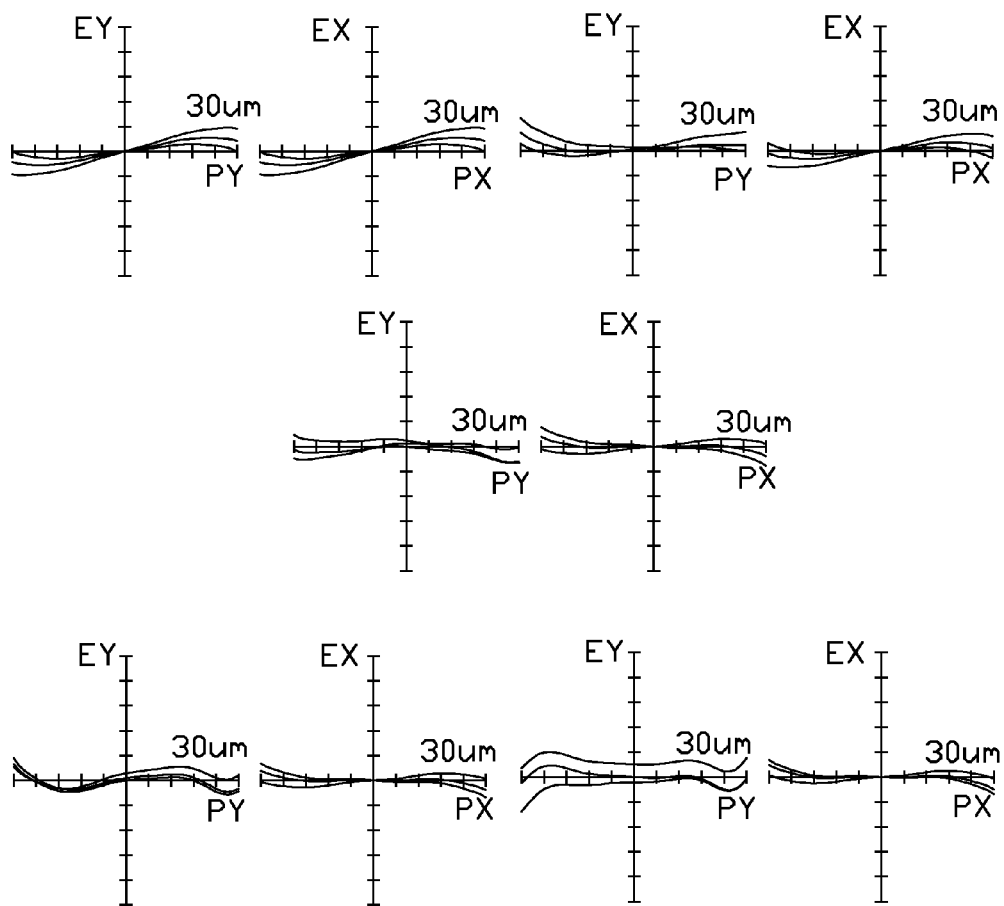
FIGS. 2-4 are graphs showing the transverse aberration, spherical aberration, and field curvature and distortion occurring in the zoom lens of FIG. 1 in a wide-angle state.
Figure 3:
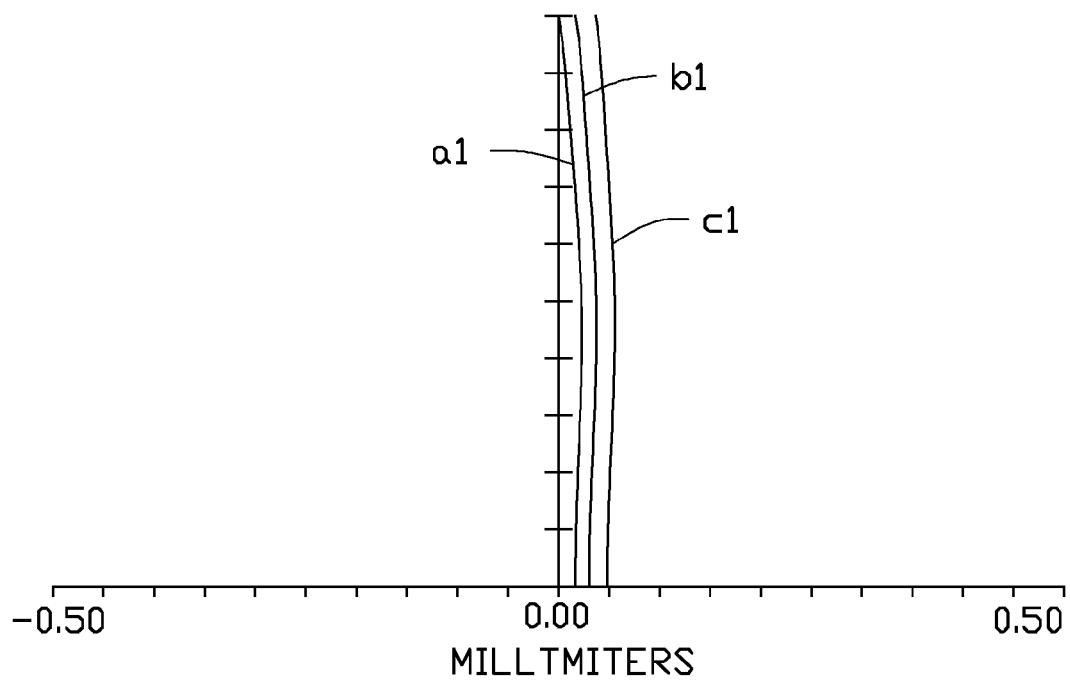
Figure 4:
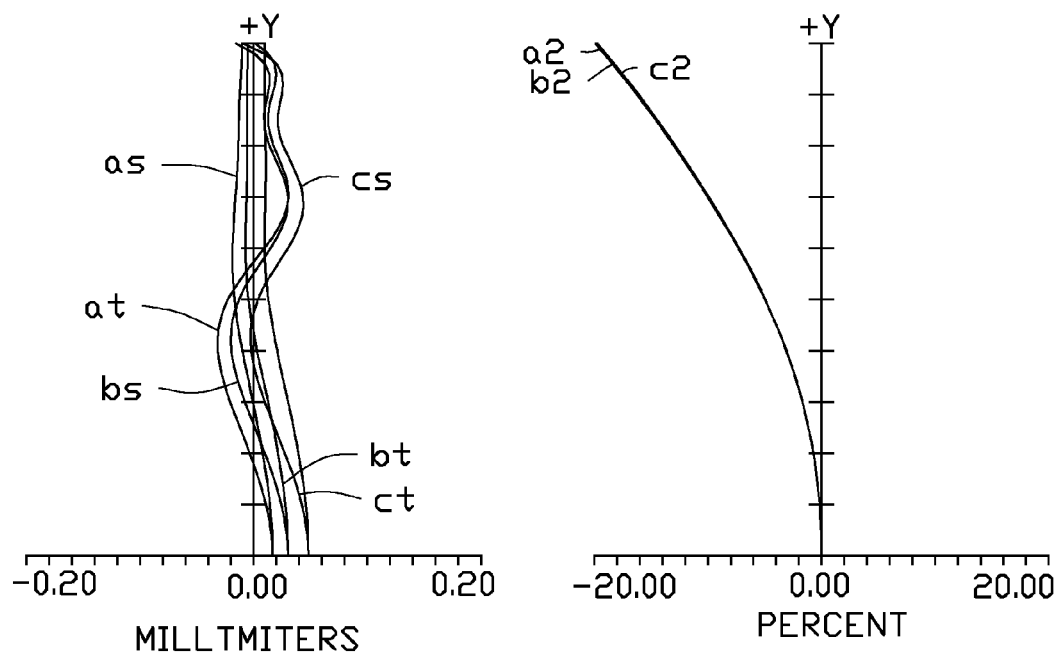
Figure 5:
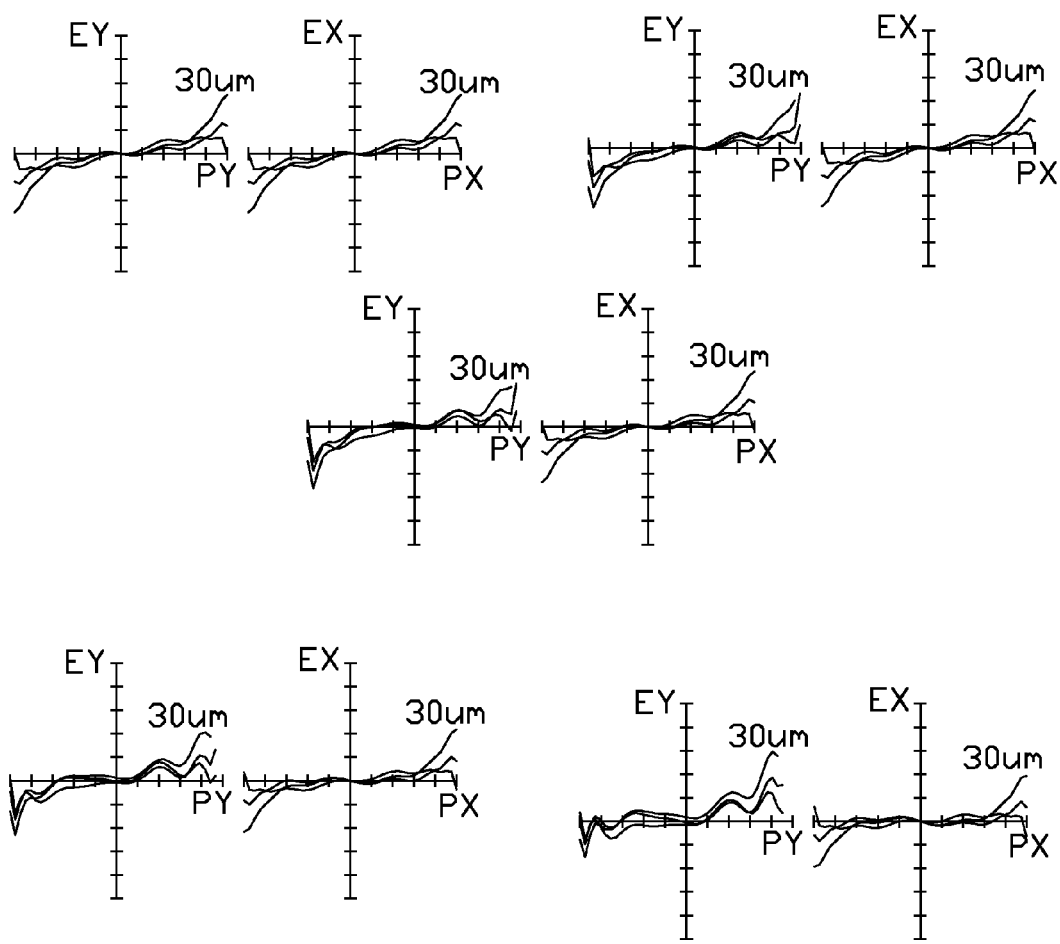
FIGS. 5-7 are graphs showing the transverse aberration, spherical aberration, and field curvature and distortion occurring in the zoom lens of FIG. 1, in a telephoto state.
Figure 6:
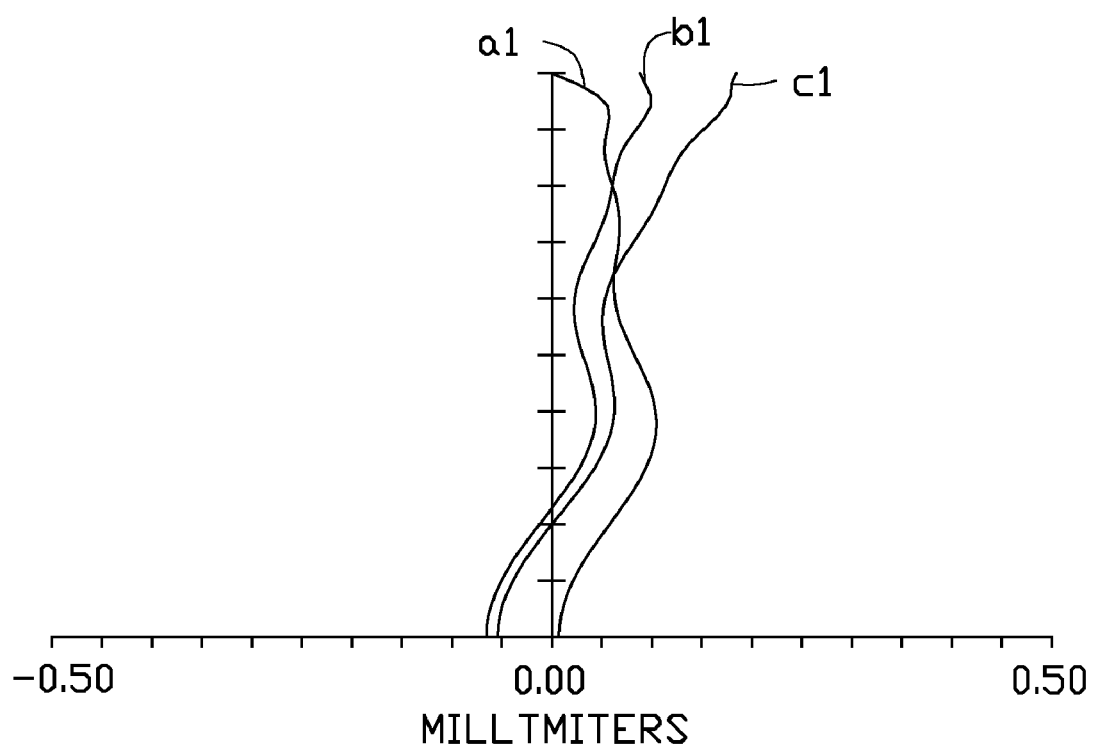
Figure 7:
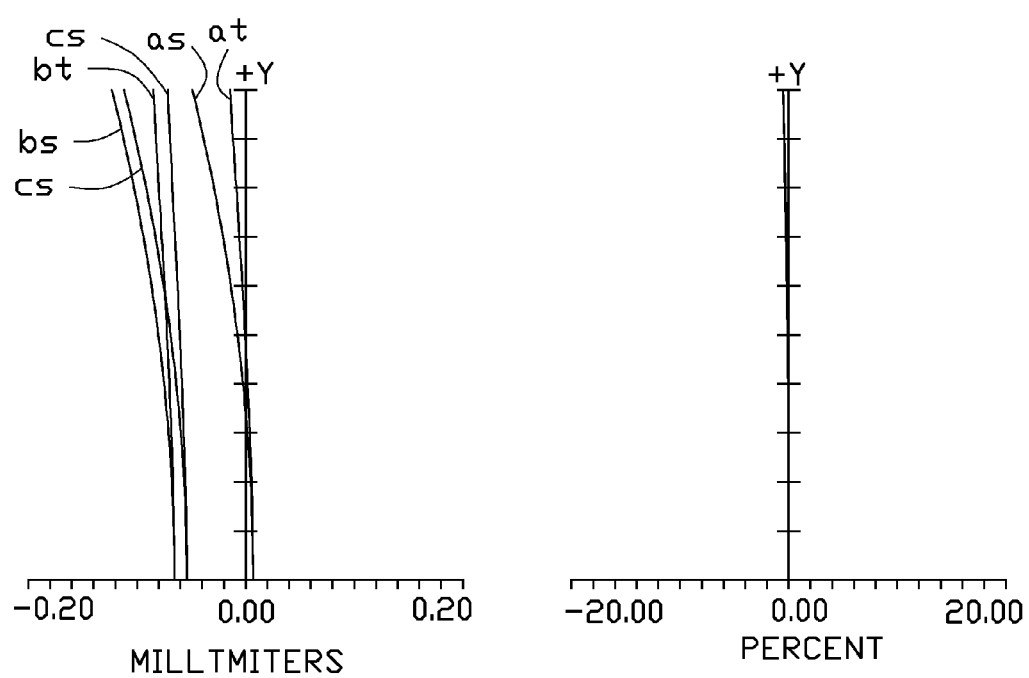

In FIGS. 2 and 5, the graphs, from top left to bottom right, show the transverse aberration characteristics of ¼ field, ½ field, ¾ field, and the whole field, and, in each graph, the curves correspond to light of the wavelengths 486 nm, 588 nm, and 656 nm. In FIGS. 3-4 and 6-7, the curves a1, b1, and c1 show the spherical aberration characteristics of light of the wavelengths 486 nm, 588 nm, and 656 nm in the zoom lens 10. The curves at, as, bt, bs, ct, and cs show the meridional and sagittal field curvatures of light of the wavelengths 486 nm, 588 nm, and 656 nm in the zoom lens 10. The curves a2, b2, and c2 depict the distortion characteristics of light of the wavelengths 486 nm, 588 nm, and 656 nm in the zoom lens 10. As shown in FIGS. 2-7, various aberrations occurring in the zoom lens 10 are controlled, increasing the resolution of the zoom lens 10.

Figure 8:
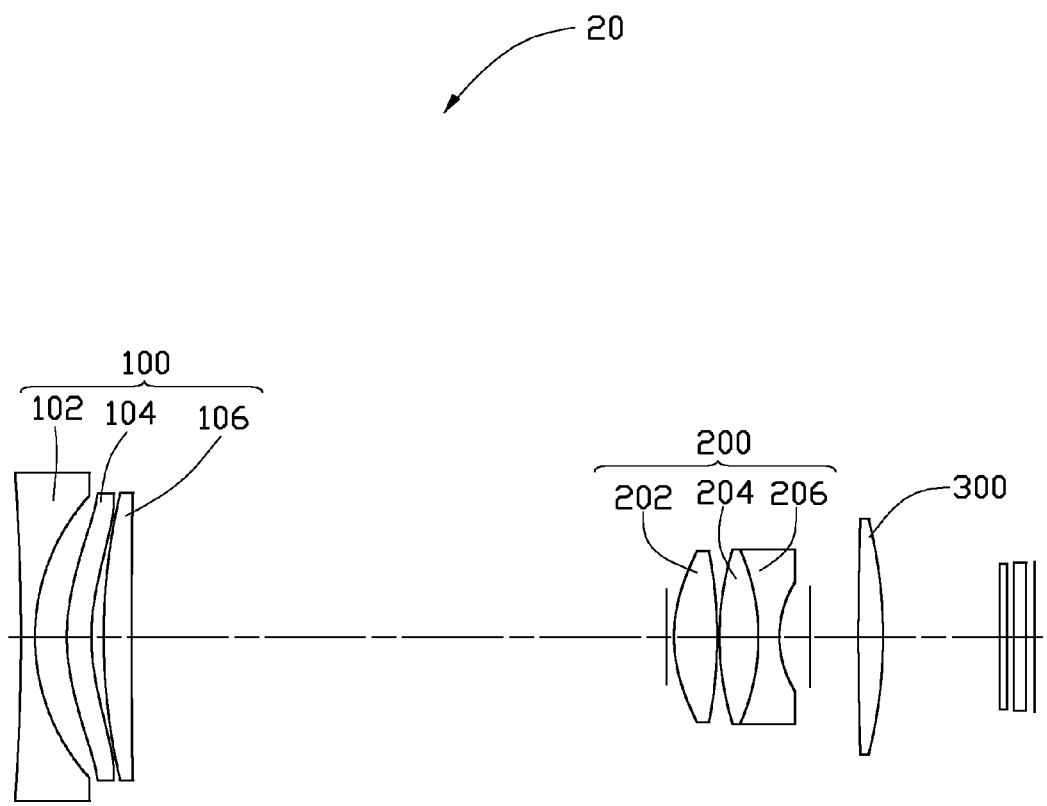
FIG. 8 is a schematic view of a zoom lens, according to another embodiment.
Figure 9:
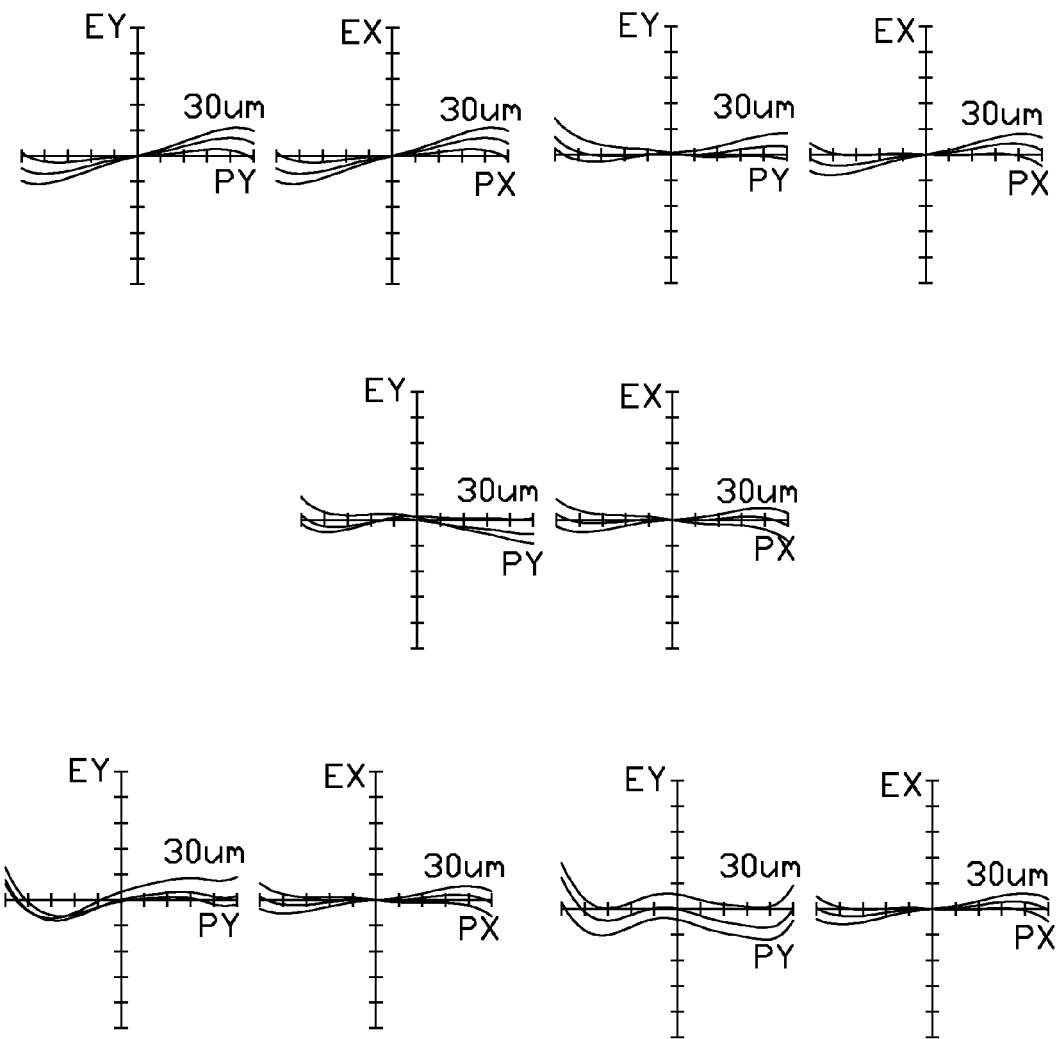
FIGS. 9-11 are graphs showing the transverse aberration, spherical aberration, and field curvature and distortion occurring in the zoom lens of FIG. 8 in a wide-angle state.
Figure 10:
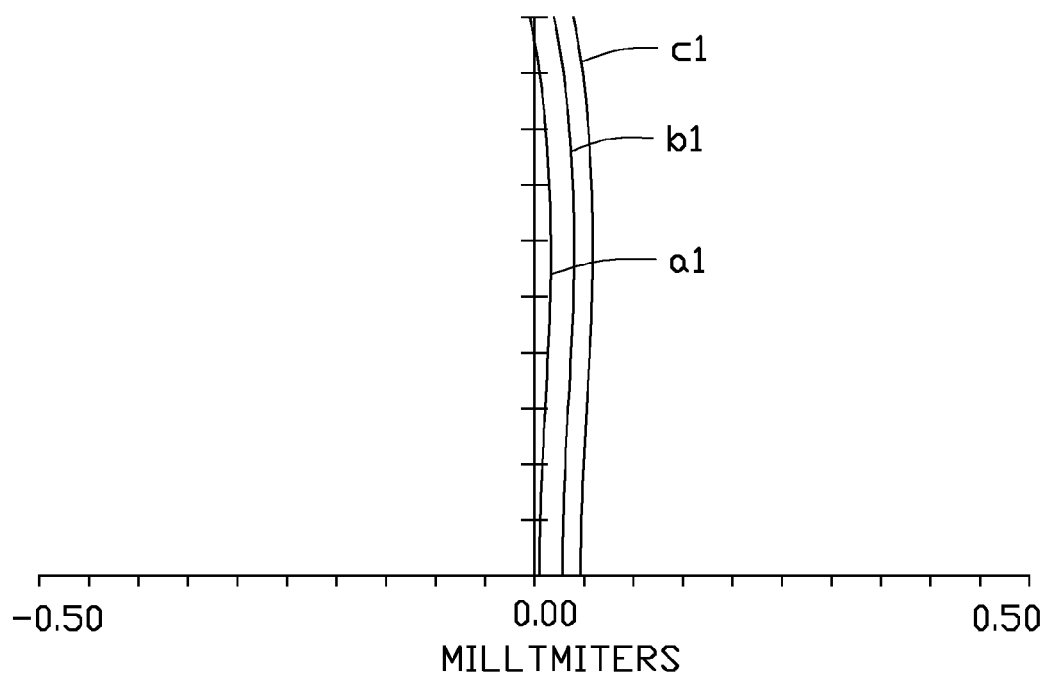
Figure 11:
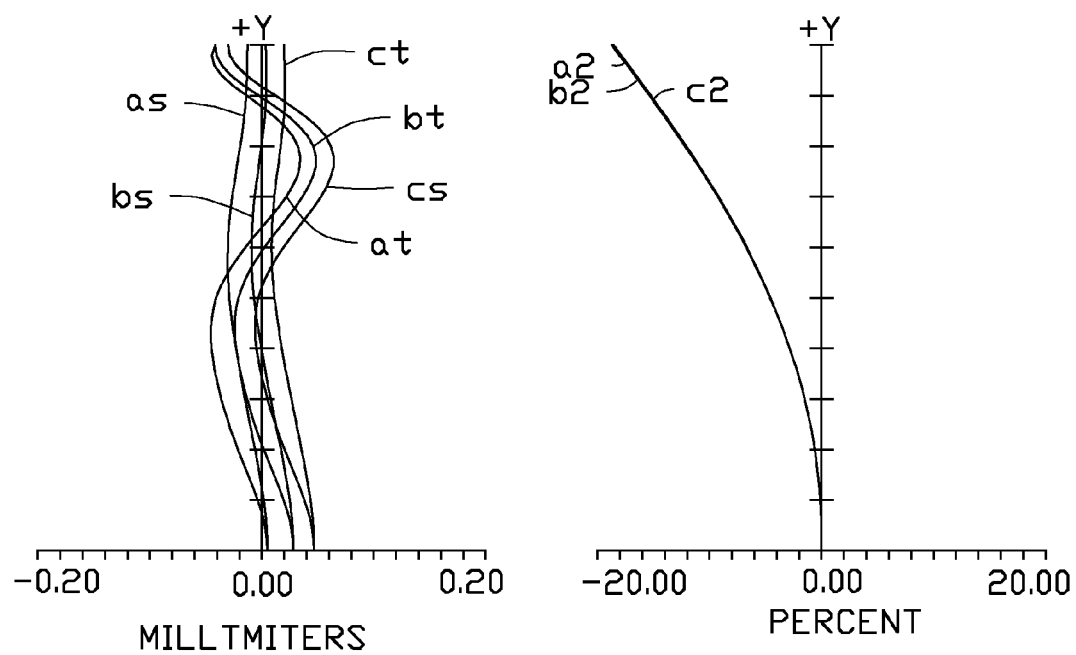
Figure 12:
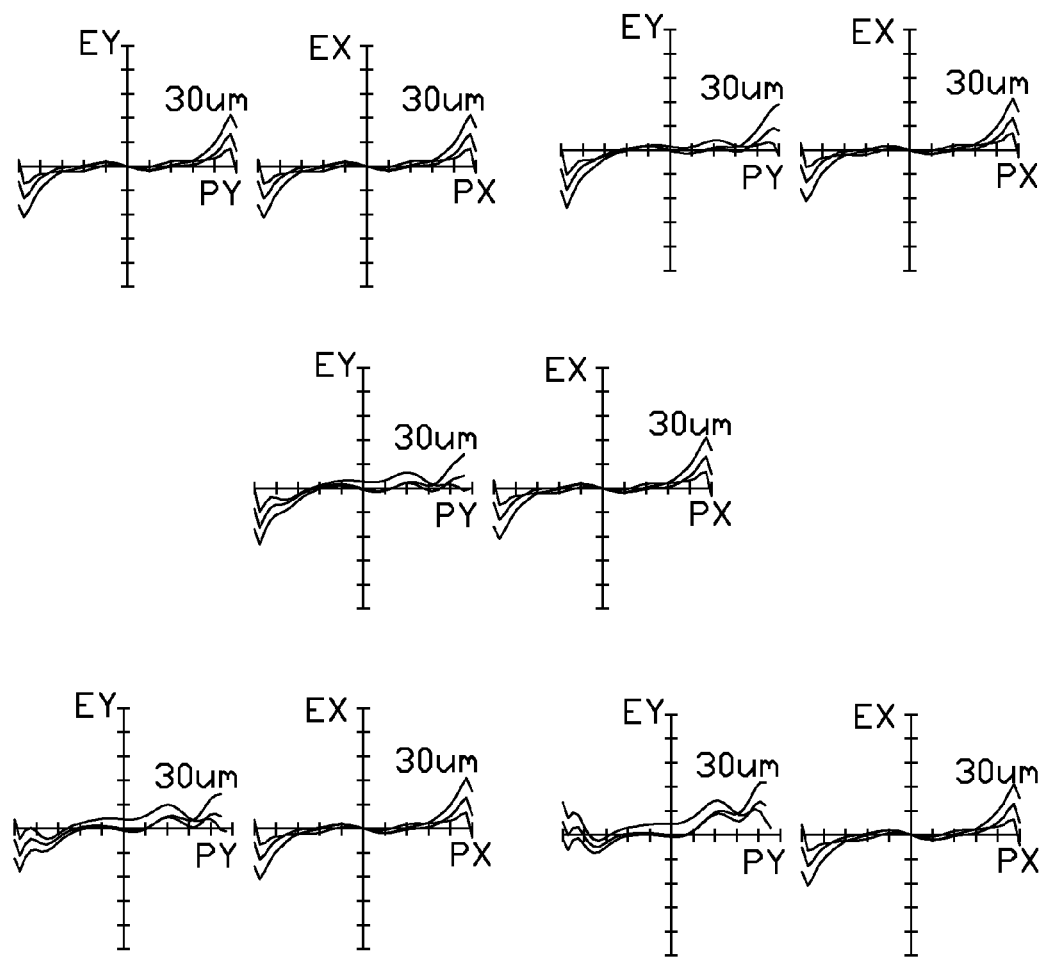
FIGS. 12-14 are graphs showing the transverse aberration, spherical aberration, and field curvature and distortion occurring in the zoom lens of FIG. 8 in a telephoto state.
Figure 13:
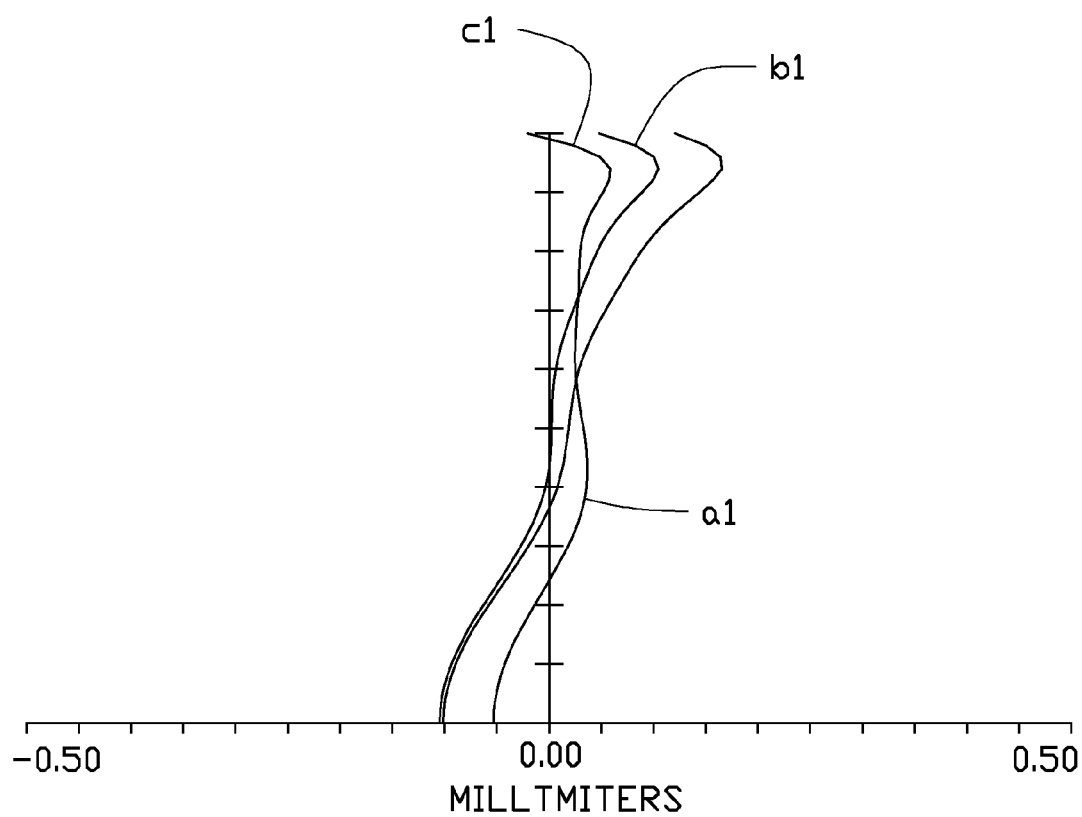
Figure 14:
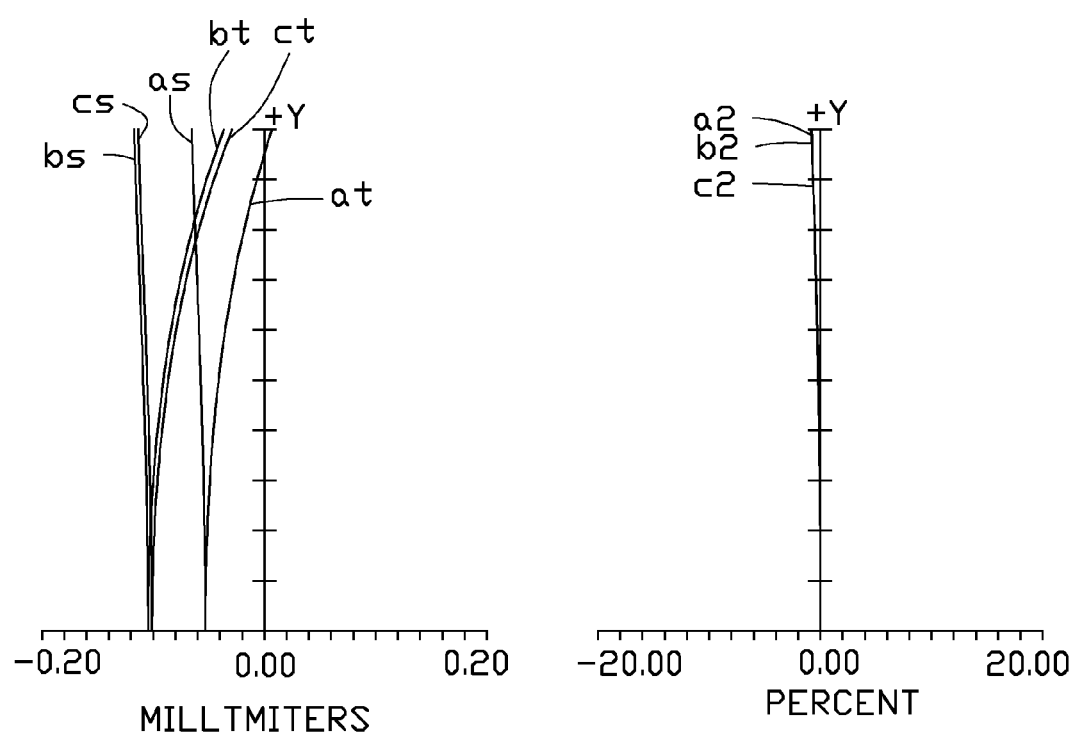

Referring to FIG. 8, a zoom lens 20, according to another embodiment, is substantially similar to the zoom lens 10 but satisfies Tables 5-8 in this way.

TABLE 5

| surface | R(mm) | D(mm) | ND | VD |
|---|---|---|---|---|
| S1 | −98.164 | 0.6 | 1.835 | 42.71 |
| S2 | 8.905 | 1.352 | — | — |
| S3 | 8.449252 | 1.044 | 1.535 | 55.99 |
| S4 | 8.80772 | 0.528 | — | — |
| S5 | 26.58 | 1.187 | 1.946 | 17.98 |
| S6 | 398.354 | D6(see Table 7) | — | — |
| S7 | Infinity | 0.3 | — | — |

TABLE 5-continued

| surface | R(mm) | D(mm) | ND | VD |
|---|---|---|---|---|
| S8 | 6.314683 | 1.837 | 1.619 | 63.86 |
| S9 | −19.38293 | 0.1 | — | — |
| S10 | 12.496 | 1.661 | 1.806 | 33.27 |
| S11 | −9.121 | 0.889 | 1.741 | 27.76 |
| S12 | 4.352 | 1.3 | — | — |

TABLE 5-continued

| surface | R(mm) | D(mm) | ND | VD |
|---|---|---|---|---|
| S13 | Infinity | D13(see Table 7) | — | — |
| S14 | 147.075 | 1.05 | 1.729 | 54.68 |
| S15 | −20.509 | D15(see Table 7) | — | — |
| S16 | Infinity | 0.3 | 1.52 | 64.2 |
| S17 | Infinity | 0.3 | — | — |
| S18 | Infinity | 0.5 | 1.52 | 64.2 |
| S19 | Infinity | 0.4 | — | — |
| IMG | Infinity | — | — | — |

TABLE 6

|  | S3 | S4 | S8 | S9 |
|---|---|---|---|---|
| k | −2.523638 | 0.6554902 | −0.487115 | −0.0111555 |
| A4 | −0.00042927112 | −0.0013555506 | −0.00052116953 | 6.6876152e−005 |
| A6 | −3.7874988e−005 | −2.7563208e−005 | 2.4691574e−005 | 2.8884653e−005 |
| A8 | 3.6431805e−006 | 3.4723458e−006 | −5.5155905e−006 | −1.1550513e−005 |
| A10 | −9.6328692e−008 | −1.0525035e−007 | −2.6243932e−007 | 1.2547865e−006 |
| A12 | −3.3054893e−010 | −4.5890591e−010 | 1.5657249e−007 | −9.6150402e−009 |
| A14 | 4.5211536e−011 | 6.1230076e−011 | −1.4964286e−008 | −6.7493613e−009 |
| A16 | −4.6969267e−013 | −7.1815015e−013 | 4.3892983e−010 | 2.9521777e−010 |

TABLE 7

| F | FNo | 2ω | D6(mm) | D13(mm) | D15(mm) |
|---|---|---|---|---|---|
| 5.194 | 3.38 | 74 | 22.781 | 2.063 | 4.963 |
| 19.835 | 5.26 | 22.4 | 2.546 | 17.377 | 3.431 |
| 29.815 | 6.15 | 15 | 0.548 | 26.722 | 0.846 |

TABLE 8

| parameter/condition formula | value |
|---|---|
| f1 | −15.935 |
| f2 | 12.806 |
| fT | 29.815 |
| L2 | 24.199 |
| V4 | 63.89 |
| V5 | 33.27 |
| V6 | 27.76 |
| |f2/f1| | 0.804 |
| L2/fT | 0.812 |
| V5/V6 | 1.198 |
| V4/V5 | 1.92 |

As shown in FIGS. 9-14, any aberrations occurring in the zoom lens 20 are also controlled.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A zoom lens, comprising, in this order from the object-side to the image-side thereof:
    a first lens group of negative refractive power;
    a second lens group of positive refractive power; and
    a third lens group of positive refractive power;
    the zoom lens satisfying the following condition formulas:

$0.68 < |f2/f1| < 0.85$, and $0.65 < L2/fT < 0.86$, where f1 represents an effective focal length of the first lens group, f2 represents an effective focal length of the second lens group, L2 is a displacement of the second lens group when the zoom lens varies from a wide-angle state to a telephoto state, and fT represents an effective focal length of the zoom lens which is in the telephoto state.

2. The zoom lens of claim 1, wherein the first lens group comprises, in this order from the object-side to the image-side of the zoom lens, a first lens of negative refractive power, a second lens, and a third lens of positive refractive power.

3. The zoom lens of claim 2, wherein the second lens comprises at least one aspheric surface.

4. The zoom lens of claim 2, wherein the second lens is a plastic lens.

5. The zoom lens of claim 1, wherein the second lens group comprises, in this order from the object-side to the image-side of the zoom lens, a fourth lens of positive refractive power, a fifth lens of positive refractive power, and a sixth lens of negative refractive power.

6. The zoom lens of claim 5, wherein the fifth lens and the sixth lens are combined together.

7. The zoom lens of claim 5, wherein the zoom lens satisfies the following condition formula: $1.05 < V5/V6 < 1.9$, where V5, V6 are Abbe numbers of d light in the fifth lens and the sixth lens, respectively.

8. The zoom lens of claim 5, wherein the zoom lens satisfies the condition formula: $1.0 < V4/V5 < 2.0$, where V4 represents the Abbe number of d light in the fourth lens.

9. The zoom lens of claim 5, wherein the fourth lens comprises at least one aspheric surface.

10. The zoom lens of claim 1, wherein the third lens group comprises a seventh lens of positive refractive power.

11. The zoom lens of claim 1, further comprising a first aperture stop interposed between the first lens group and the second lens group.

12. The zoom lens of claim 1, further comprising a second aperture stop interposed between the second lens group and the third lens group.

* * * * *